United States Patent
Laczko

[11] 3,893,792
[45] July 8, 1975

[54] CONTROLLER FOR INJECTION MOLDING MACHINE

[75] Inventor: Frank Laczko, Duxbury, Mass.

[73] Assignee: BBF Group, Inc., Westwood, Mass.

[22] Filed: Apr. 6, 1973

[21] Appl. No.: 348,614

[52] U.S. Cl. ............... 425/149; 164/155; 264/40
[51] Int. Cl. ............................................. L29f 1/06
[58] Field of Search ............... 425/149; 164/4, 155; 264/40

[56] References Cited
UNITED STATES PATENTS

| | | | |
|---|---|---|---|
| 2,671,247 | 3/1954 | Lester | 425/149 |
| 3,358,743 | 12/1967 | Adams | 164/155 UX |
| 3,628,901 | 12/1971 | Paulson | 264/40 X |
| 3,721,512 | 3/1973 | Ma et al. | 425/149 |
| 3,726,334 | 4/1973 | Sallberg et al. | 164/4 X |
| 3,741,700 | 6/1973 | Hutchinson et al. | 425/149 X |
| 3,767,339 | 10/1973 | Hunkar | 425/149 X |

*Primary Examiner*—R. Spencer Annear
*Attorney, Agent, or Firm*—Wolf, Greenfield & Sacks

[57] ABSTRACT

In an injection molding machine there is provided control circuitry for monitoring a number of predetermined process conditions for controlling the quality and consistency of injection molded articles. The system comprises a hydraulic pressure transducer and a cavity pressure transducer employed in concert with the control circuitry which monitors the viscosity of the article presently being formed, provides a corrective adjustment during the present cycle when the measured viscosity deviates from a reference viscosity, compares the applied hydraulic pressure with a hydraulic reference pressure, and measuring the peak cavity pressure during one cycle in order to control the applied pressure during the subsequent cycle as a function of the previously measured peak cavity pressure.

24 Claims, 4 Drawing Figures

CONTROLLER FOR INJECTION MOLDING MACHINE

FIELD AND BACKGROUND OF THE INVENTION

The present invention relates in general to an injection molding machine, and in particular to an improved means and method for controlling the quality and consistency of articles produced by the injection molding machine.

An injection molding machine typically comprises a mold defining a mold cavity, means for opening and closing the mold, a hopper in which may be stored a thermoplastic material, and a hydraulic pressure ram or the like to force the plasticized molding material into the mold cavity. The machine is typically operated cyclically and it has been found that there are a number of different variables that can be controlled to control the quality of the molded article. Also, it has been found that conditions may change between cyles of operation. Some of the conditions and factors that complicate the control process include the ratio of new material to old recycled material, changes in the consistency between different batches of material, changes in the mold temperature, variations that occur due to the shut-down time between cycles of operation, and other ambient conditions.

A typical prior art system is shown, for example, in U.S. Pat. No. 3,628,901. This patent discloses an injection molding machine having control means for monitoring product quality. One of the teachings of this patent is concerned with sensing the peak plasticized melt pressure during an injection molding cycle for controlling during the subsequent injection molding cycle the applied hydraulic pressure as a function of the peak pressure. One of the drawbacks with this patent is that the feedback control only takes effect in the succeeding cycle and this system does not provide means for detecting undesired changes in the current cycle, such as an instantaneous change in viscosity due to an air pocket, for example, in the plasticized material being fed to the cavity. Also, because a previous peak cavity pressure is primarily relied upon in this prior art device for controlling the applied hydraulic pressure in a subsequent cycle, it is quite possible for an overcompensation to take place requiring a close down of the machine until the cause of the problem can be identified. This system close down delays the injection molding process and may cause a decreased yield and an attendant increase in the price of the final product.

OBJECTS OF THE INVENTION

Accordingly, it is an object of the present invention to provide an improved control means for continuously and effectively monitoring the consistency and quality of articles produced by an injection molding machine.

Another object of the present invention is to provide a controller including means for sensing the applied pressure and means for sensing the cavity pressure for establishing a viscosity error signal useful during the current injection molding cycle for varying the applied pressure when the measured viscosity deviates from some predetermined reference viscosity.

Still another object of the present invention is to provide a controller for an injection molding machine that is capable of providing a combined error signal representative of a sensed deviation from a predetermined normal condition during a first portion of the cycle for controlling the applied pressure for the remainder of the cycle, said signal also representative of the cumulative sensed peak pressures of previous cycles for also effecting the applied pressure in the present cycle.

Still a further object of the present invention is to provide a controller for an injection molding machine which automatically provides a corrective control error signal during the cycle in process in response to a sensed viscosity that deviates from the reference viscosity, and a sensed hydraulic pressure that deviates from a sensed reference hydraulic pressure. Both of these error signals are combined together to provide a process index error signal, which may be scaled or modified by a factor representing the peak cavity pressure errors.

SUMMARY OF THE INVENTION

To accomplish the foregoing and other objects of this invention there is provided a controller for an injection machine having a mold defining a cavity for receiving preferably thermoplastic material to form an article of a shape defined by the configuration of the cavity. In the disclosed embodiment of the present invention the controller comprises a first transducer for sensing the hydraulic pressure applied to the plasticized material, a second transducer for sensing the cavity pressure, means coupled from said first and second transducer means for establishing a viscosity error signal by comparing the detected viscosity during a first portion of the cycle with a reference viscosity, means coupled from the first transducer means for establishing a hydraulic error signal when the sensed hydraulic pressure deviates from a predetermined reference pressure and means for combining the viscosity error signal and the hydraulic error signal to provide what is termed a process index error signal. This error signal is used in the same cycle that it is detected to alter the pressure applied by a hydraulic pressure ram or the like.

The controller of this invention may also comprise means for detecting the peak cavity pressure and means for comparing this peak cavity pressure with a reference cavity pressure to provide a peak cavity pressure error signal if there is any deviation therebetween. This error signal is summed with previous error signals and in a subsequent cycle this cumulative error is useable to modify the process index error for altering the applied pressure as a function of the peak cavity pressure.

BRIEF DESCRIPTION OF THE DRAWINGS

Numerous other objects, features and advantages of the invention will now become apparent upon a reading of the following detailed description taken in conjunction with the accompanying drawings, in which.

DETAILED DESCRIPTION

Figure 1:
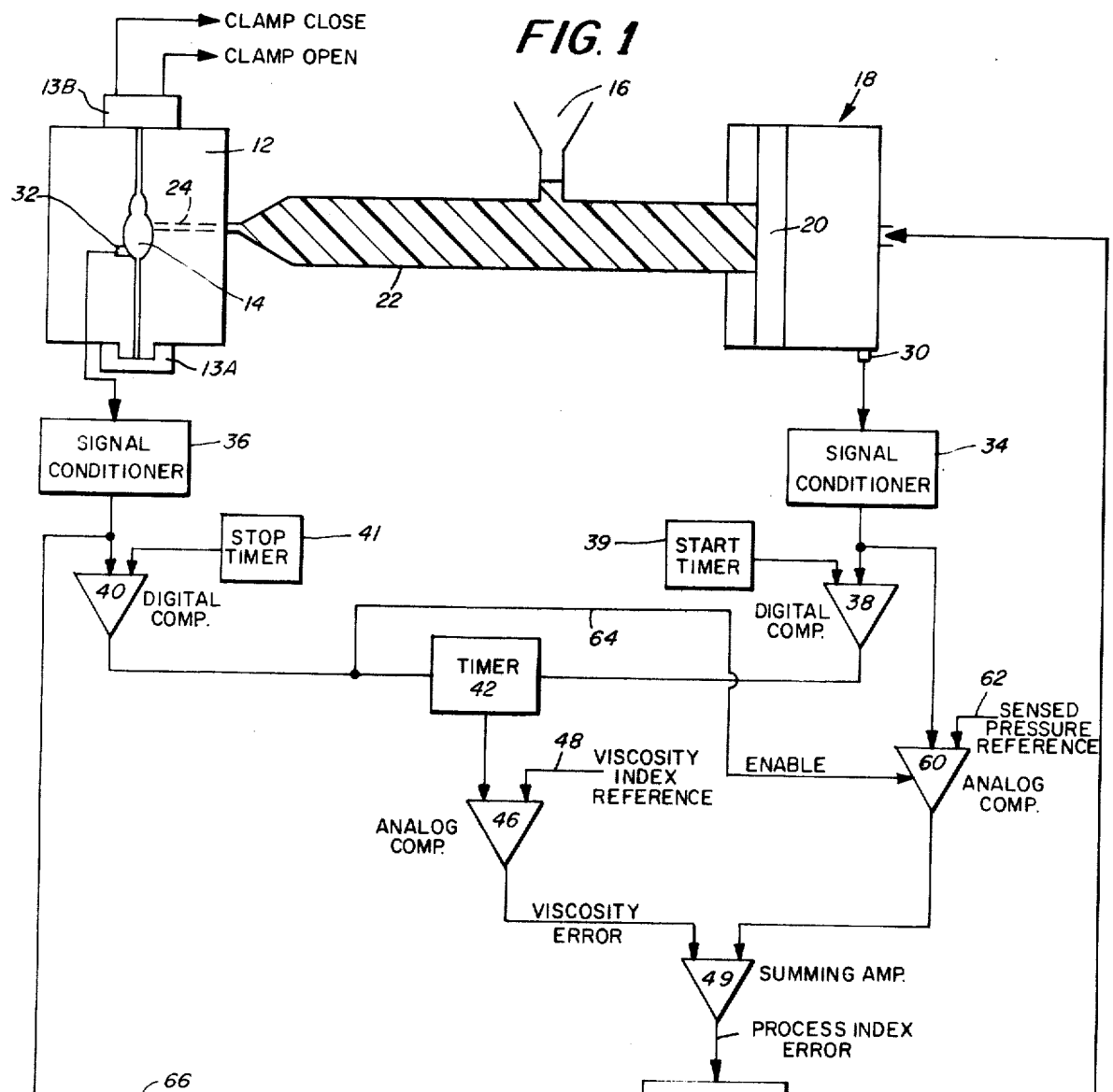
FIG. 1 schematically illustrates an injection molding machine and shows in block form the controller of the present invention.

Referring now to the drawings, and in particular to FIG. 1, there is schematically shown at least some of the parts of an injection molding machine which in itself may be of conventional design. This injection molding machine comprises a mold 12 defining a mold cavity 14 of preselected configuration, hopper 16, and hydraulic actuator 18. The hydraulic actuator 18 drives a ram 20 which may partially fit within barrel 22 to force the molding material received from hopper 16 and plasticized in barrel 22, through sprue 24 and into mold cavity 14.

FIG. 1 discloses one diagrammatic illustration for an injection molding machine. It should be obvious to one skilled in the art that other types of injection molding machine may also be readily useable with the controller of the present invention.

The mold 12 also typically has a clamping means associated therewith which may be of conventional design. In FIG. 1 this means is illustratively depicted as including clamp portions 13A and 13B. Means are associated with clamp portion 13B, for example, for generating a CLAMP CLOSE signal upon closure of the mold and a CLAMP OPEN signal upon opening of the mold. These signals may be generated in a conventional manner using one or more bistable devices, for example, and these signals may be represented by positive pulses of predetermined duration.

In accordance with the present invention a hydraulic pressure transducer 30 is operatively coupled to the hydraulic actuator 18 so as to sense the pressure applied by ram 20 on the plasticized melt or material. In addition, a cavity pressure transducer 32 is operatively disposed adjacent cavity 14 in a position to measure the pressure in the cavity resulting from operation of the ram.

Figure 2:
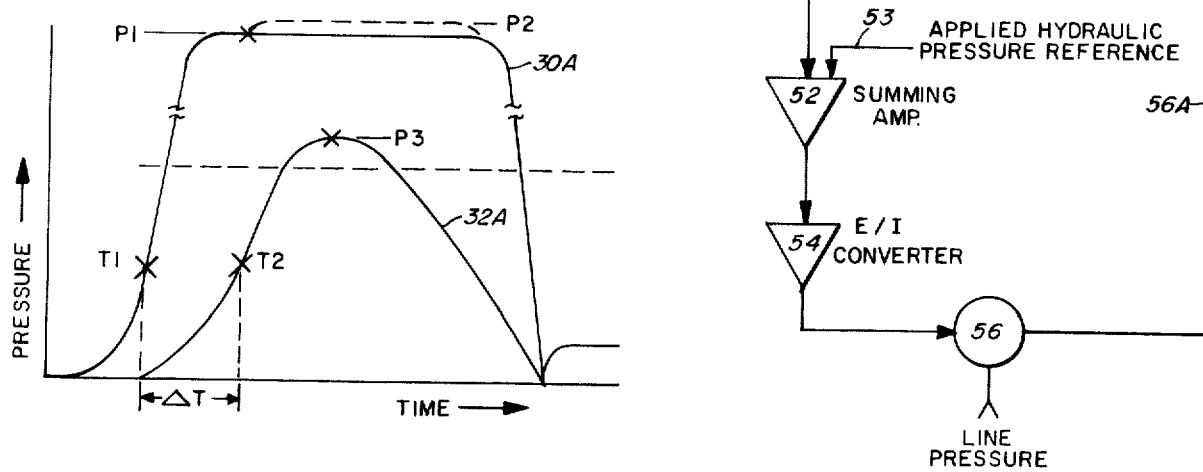
FIG. 2 shows two pressure vs. time plots for applied hydraulic pressure and measured cavity pressure.

At the commencement of a cycle of the injection molding machine, the hydraulic pressure transducer 30 first senses a pressure increase caused by hydraulic actuator 18. As the cavity 14 is being filled the cavity transducer 32 at some later time detects an increasing cavity pressure. FIG. 2 is a plot showing the pressure variations with time for both transducers 30 and 32. From FIG. 2 it is noted that the waveform 32A does not commence rising until some time after the waveform 30A indicates a pressure increase at the ram 20. The waveform 32A reaches a typical peak pressure of approximately 2,000 psi whereas the waveform 30A may reach a typical peak pressure level of 20,000 psi.

The signal from transducer 30 is coupled to signal conditioner 34, and similarly, the signal from cavity transducer 32 is coupled to signal conditioner 36. The transducers 30 and 32 may each comprise a strain gauge whose winding couples to a bridge circuit of the signal conditioner. Each of the signal conditioners may also comprise amplifying means for establishing an output voltage continuously corresponding to the sensed pressure of its associated transducer. The output from the signal conditioners 34 and 36 couple respectively to digital comparators 38 and 40. The output of the digital comparators in turn couple to timer 42.

The digital comparator 38 includes a second input coupled from start timer 39. The output of timer 39 may be an adjustable voltage reference corresponding to a predetermined pressure which is shown in FIG. 2 as being reached at time T1. Thus, the output of timer 39 establishes a starting time reference. When the output from signal conditioner 34 exceeds the reference established by timer 39 an output is established at the output of comparator 38 which signal is coupled to timer 42 for commencing the operation thereof. Timer 42 is preferably of the type that operates from the 120 volt, 60 cycle line. This timer commences operation upon receipt of a signal from comparator 38 and terminates operation when a signal is received from comparator 40. The output of timer 42 is an analog voltage that is proportional to the time period over which timer 42 was active. This time period is designated in FIG. 2 as ΔT.

Transducer 32, like hydraulic pressure transducer 30, senses the pressure in cavity 14 and the electrical signal at the output of conditioner 36, which is representative of this sensed pressure, is compared with a reference voltage from stop timer 41. The output from timer 41 is a voltage corresponding to a predetermined reference pressure for the cavity which is attained at time T2 in FIG. 2. Thus, when the voltage from signal conditioner 36 exceeds the output reference set by timer 41 the digital comparator 40 generates a pulse that stops timer 42. At that time the output of timer 42 is a voltage corresponding to the time period over which timer 42 was activated. This voltage, of course, if also an indication of the viscosity of the material being fed to cavity 14. The higher the viscosity the longer the ΔT period. FIG. 2 shows the time interval ΔT which is a function of the viscosity of the plasticized material.

The output of timer 42 is monitored by analog comparator 46. A second input to comparator 46 is shown on line 48 as a preset viscosity index reference level. Regarding FIG. 2 the comparison performed by analog comparator 46 takes place at approximately time T2 when only a portion of the cycle has been completed.

The viscosity index reference level is established empirically at the time the plastic injection molding machine is first placed in operation and is controlled manually. An initial setting is made on the controller based upon the viscosity of the material initially molded and established by observation of the parts being molded and recognized as being up to standard. If the output analog voltage from timer 42 exceeds the reference level on line 48 a viscosity index error signal is generated at the output of the analog comparator 46. The output of comparator 46 is fed to summing amplifier 49 and from thence by way of process control logic 50, summing amplifier 52, and voltage to current (E/I) converter 54 to servo drive 56 which in turn controls the hydraulic pressure by way of line 56A applied to hydraulic actuator 18.

Assuming that there is no viscosity index error signal generated and that there are no other error signals generated by way of means discussed hereinafter, then no pressure change is required at the hydraulic actuator 18, and the setting of the servo drive 56 and position of actuator 18 remain at their original settings. If, however, the voltage signal from timer 42 does not equal the viscosity index reference level, the generated viscosity error signal causes a change in the output of servo drive 56 which in turn changes the hydraulic pressure applied by actuator 18. The remainder of the logic blocks of FIG. 1 are discussed in more detail hereinafter.

The output of summing amplifier 49 is referred to as the process index error and is actually a function of two different errors, the viscosity index error which has previously been discussed and the hydraulic pressure error coupled from analog comparator 60. Analog comparator 60 receives one input from signal conditioner 34 which is a voltage representative of the pressure sensed by transducer 30, and a second input on line 62 referred to as the sensed hydraulic pressure reference level. This pressure reference level may be set at a predetermined voltage level or this may be a signal level generated by the system. If the output of signal conditioner 34 exceeds the reference level on line 62, a hydraulic pressure error signal is generated at the output of analog comparator 60. This signal is combined with the output of comparator 46 by summing amplifier 49. The circuitry including comparator 60 is useful for insuring that the pressure sensed by transducer 30 is maintained at the P1 pressure level (see FIG. 2), and that this pressure level has not changed at time T2 because of some outside influence such as a change in line pressure. If a pressure differential is detected by analog comparator 60 the error signal is fed to summing amplifier 49 but only when enable line 64 permits this operation. Line 64 disables comparator 60 until time T2 has been reached or alternatively, there is an output from digital comparator 40. It is only at that time that we want to determine whether a hydraulic pressure error signal is necessary.

Therefore, in the same cycle a process index error which is a combination of the viscosity index error and hydraulic pressure error may be generated at the output of summing amplifier 49. This error is coupled by way of the process control logic 50 to summing amplifier 52. Summing amplifier 52 also includes a second input on line 52 referred to as the applied hydraulic pressure reference level which is usually manually controlled. The error signal from logic 50 to summing amplifier 52 contributes to the level set on line 53 for controlling the servo drive 56 by way of converter 54 which may be of conventional design. Also, it is noted that this error has a corrective contribution in the same cycle that it is detected. For example, if the output from amplifier 49 indicates an error of predetermined polarity because, for example, ΔT increased, an adjustment is necessary and is immediately made so that the applied pressure is raised from level P1 to P2 as indicated by the dotted line in FIG. 2. It is important to appreciate that the time error signal causes a change in the pressure applied by hydraulic actuator 18 during the same cycle in which the tests are actually made.

Up to this point operation has only been discussed within a single cycle of operation and the other inputs provided to process control logic 50 have been ignored in dicussing the operation of FIG. 1. However, in order to understand the operation of the entire controller of this invention, reference is now also made to the logic block diagram of FIG. 3 which shows the process control logic 50 in somewhat more detail.

This logic continually monitors the peak cavity pressure and modifies the process index error in accordance with the cumulative peak error in subsequent cycles of operation. If the peak cavity pressure as represented by pressure P3 in FIG. 2 remains constant then the process index error is not modified from cycle to cycle thereby. As depicted in FIG. 1 line 66 couples to process control logic 50 along with a cavity pressure reference level established on line 68.

Figure 3:
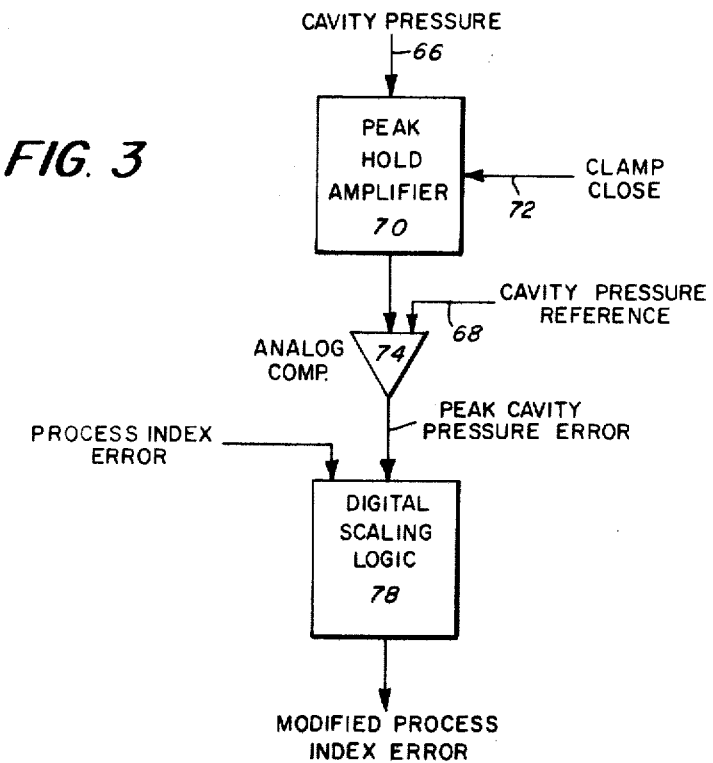
FIG. 3 is a logic block diagram showing the process control logic of FIG. 1 in somewhat more detail.

The process control logic of FIG. 3 comprises a peak hold amplifier 70, analog comparator 74, and digital scaling logic 78. The amplifier 70 may be of conventional design and include, for example, an analog to digital converter and one or more logic gates. Amplifier 70 may be considered a type of sample and hold circuit in that it holds the peak signal for a predetermined period. The output of amplifier 70 is a voltage corresponding to the peak of waveform 32A of FIG. 2 After waveform 32A decreases the output stays constant and amplifier 72 is only reset by the CLAMP CLOSE signal which is a pulsed signal occurring after the mold is opened and later closed. The peak cavity signal from amplifier 70 is compared with a cavity pressure reference level on line 68 and if there is a difference therebetween an error signal is coupled to the digital scaling logic for altering the process index error which is also coupled to the digital scaling logic. The output of logic 78 may be termed the modified process index error. It is this signal that is fed to amplifier 52. If there is no error signal from comparator 74 the process index error is passed via logic 78 without being altered by a peak cavity error signal.

Figure 4:
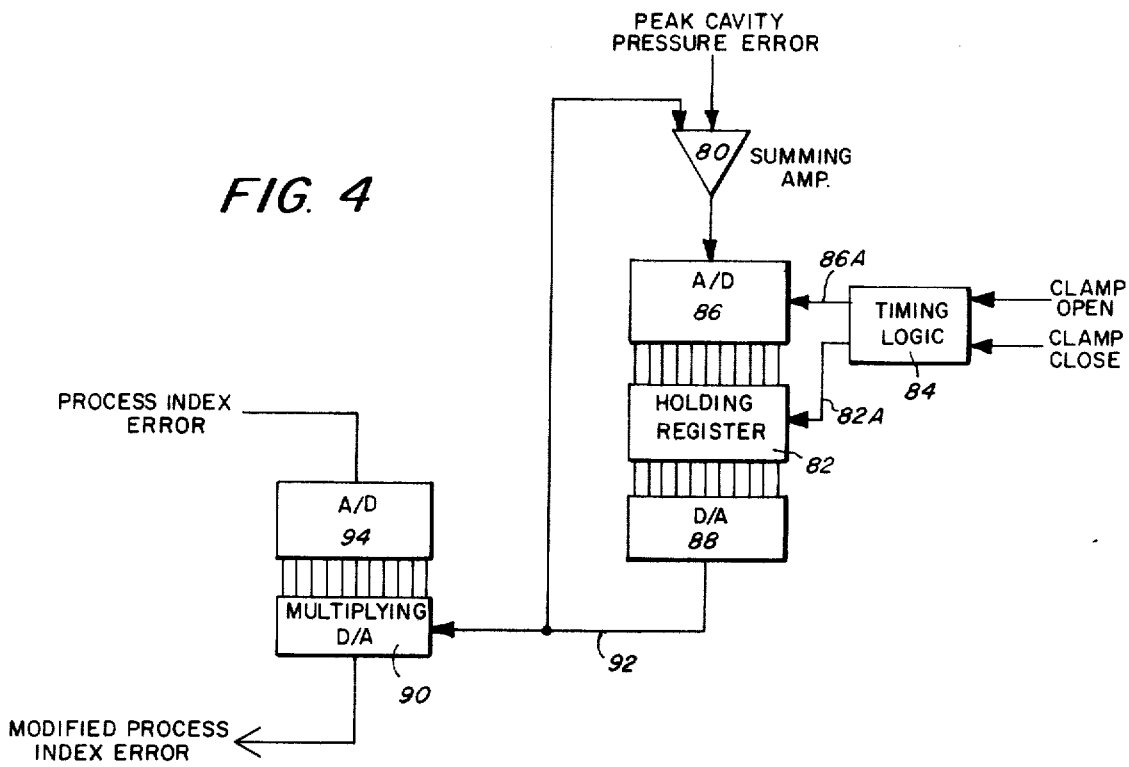
FIG. 4 is a logic block diagram showing the digital scaling logic of FIG. 3 in somewhat more detail.

The digital scaling logic of FIG. 3 is shown in detail in FIG. 4 and comprises summing amplifier 80, holding register 82 and timing logic 84. The output of amplifier 80 feeds to A/D converter 86 whose multi-bit output couples to holding register 82. Converter 86 and holding register 82 receive transfer signals on lines 86A and 82A, respectively, from timing logic 84. The CLAMP OPEN and CLAMP CLOSED signals are coupled to logic 84. The digital output of register 82 couples to D/A converter 88 and the output of converter 88 connects to amplifier 80 and multiplying D/A converter 90. If there is no peak cavity pressure error signal a ZERO count is registered and the multiplying factor coupled on line 92 to D/A converter 90 is essentially unity thereby not altering the process index error.

The logic of FIG. 4 also comprises A/D converter 94 whose output couples to converter 90 whose output is in turn referred to as the modified process index error. If there is a peak cavity pressure error signal generated during one cycle this error signal does not affect the converter 90 by way of line 92 until the next cycle. Thus, if it is assumed that the register 82 contains a predetermined count for one cycle, the timing logic 84 controls the signal fed to converter 90 during clamp opening and closing in accordance with the new peak cavity error signal to thereby modify the process index error during the next cycle.

The operation is as follows: the peak cavity error signal which is summed with the output of converter 88 is coupled to A/D converter 86. The output of converter 86 is only transferred to register 82, however, when line 86A is enabled which in turn happens when the CLAMP OPEN signal is present. Thus, register 82 holds a count after the cycle has been completed representative of the peak cavity error signal. When the CLAMP CLOSE signal occurs indicating commencement of a new cycle line 82A is enabled and the contents of register 82 are coupled to converter 88 and by way of line 92 to converter 90. The new voltage on line 92 causes a modification of the process index error. If no further correction is required and the peak cavity error signal is not present in the next cycle then the feedback from converter 88 to amplifier 80 insures that the count in register 82 stays constant.

It should be obvious that the count in register 82 may change in either direction depending upon directional changes in the peak cavity pressure that is sensed. The logic of FIG. 4 can handle changes of either polarity.

Also, the design of timing logic 84 should be obvious to one skilled in the art. For example, logic 84 may include a pair of flip-flops or mono-stable multivibrators.

What is claimed is:

1. For an injection molding machine having a mold defining a cavity for receiving a plasticized material to form an article during a cycle of operation of the machine, a controller comprising:
    variable pressure applying means for forcing the material into the cavity,
    means associated with the variable pressure applying means for sensing applied pressure,
    transducer means in or proximate said cavity for sensing cavity pressure,
    means responsive to the applied and cavity pressures for establishing a time reference viscosity signal,
    means for establishing a viscosity error signal during an initial portion of the cycle when the time reference viscosity signal deviates from a predetermined reference signal,
    and means responsive to said viscosity error signal for operating the pressure applying means at a new pressure level during the remainder of the cycle.

2. The controller of claim 1 wherein said means for providing a viscosity error signal comprises means coupled from said applied pressure sensing means for establishing a first circuit condition when the applied pressure reaches a predetermined threshold level, and means coupled from said cavity pressure sensing means for establishing a second circuit condition when the cavity pressure reaches a predetermined threshold level.

3. The controller of claim 2 comprising timer means responsive to said means for establishing the first and second circuit conditions, said timer means defining an output time interval representative of the time difference between the establishing of the first and second circuit conditions.

4. The controller of claim 3 wherein said timer means has an output voltage, upon establishment of said second circuit condition, that is a function of said time difference.

5. The controller of claim 2 wherein each means for establishing a circuit condition includes a digital comparator having one fixed threshold input.

6. The controller of claim 4 comprising means for comparing the output of said timer means with a viscosity reference level to provide said viscosity index error signal.

7. The controller of claim 6 wherein said means for comparing inclues an analog comparator.

8. For an injection molding machine having a mold defining a cavity for receiving a plasticized material to form an article during a cycle of operation of the machine, a controller comprising:
    variable pressure applying means for forcing the material into the cavity,
    means for sensing applied pressure,
    means for sensing cavity pressure,
    means responsive to the applied and cavity pressures for establishing a time reference viscosity signal,
    means for establishing a viscosity error signal during an initial portion of the cycle when the time reference viscosity signal deviates from a predetermined reference signal,
    means for providing an applied pressure error signal when the applied pressure deviates from a predetermined reference pressure,
    and means responsive to said viscosity error signal for controlling the applied pressure during the remainder of the cycle.

9. The controller of claim 8 wherein said means for providing an applied pressure error signal includes means coupled from said applied pressure sensing means for comparing the signal therefrom with a pressure reference threshold.

10. The controller of claim 9 including means for inhibiting the applied pressure error signal during the initial portion of the cycle.

11. The controller of claim 10 wherein said means for providing a viscosity error signal comprises means coupled from said cavity pressure sensing means for determining when the cavity pressure reaches a predetermined value to generate an enabling signal, said enabling signal being present only when said predetermined value is attained.

12. The controller of claim 8 comprising means for summing said applied pressure error signal and viscosity error signal to provide a summed error signal.

13. The controller of claim 12 comprising means coupled from said means for sensing cavity pressure for registering the peak cavity pressure during the operating cycle.

14. The controller of claim 13 comprising means for providing a peak cavity pressure error signal when the measured peak cavity pressure deviates from a predetermined peak cavity reference pressure.

15. The controller of claim 14 comprising means for modifying said summed error signal by a cumulative peak cavity pressure error signal to provide a modified error signal.

16. The controller of claim 15 wherein said modifying means comprising a register for storing a code representative of the peak cavity error signal and means responsive to said code for altering in a subsequent cycle summed error signal as a function of said peak cavity error signal.

17. For an injection molding machine having a mold defining a cavity for receiving a plasticized material to form an article during a cycle of operation of the machine, a controller comprising;
    means for applying pressure to force the material into the mold cavity,
    means for sensing applied pressure and providing a signal representative of applied pressure,
    means for sensing cavity pressure and providing a signal representative of cavity pressure,
    means responsive to said applied pressure signal and said cavity pressure signal for providing a signal representative of the viscosity of the material,
    means responsive to said viscosity signal deviating from a predetermined reference signal during an initial portion of the cycle for establishing a viscosity error signal,
    means responsive to said applied pressure signal deviating from a predetermined reference signal for establishing an applied pressure error signal,
    means for combining said viscosity error signal and said applied pressure error signal,
    and means responsive to said combining means for controlling the pressure applied during the remainder of the cycle.

18. The controller of claim 17 including means for inhibiting the means for establishing an applied pressure error signal until the cavity pressure signal has reached a predetermined level.

19. The controller of claim 17 comprising means responsive to said cavity pressure signal for registering the peak cavity pressure during the operating cycle.

20. The controller of claim 19 comprising means for providing a peak cavity pressure error signal when the measured peak cavity pressure deviates from a predetermined peak cavity reference pressure.

21. The controller of claim 20 comprising means for modifying the combined error signal by a cumulative peak cavity pressure error signal.

22. For an injection molding machine having a mold defining a cavity for receiving a plasticized material to form an article during a cycle of operation of the machine, a controller comprising;

means responsive to applied pressure and cavity pressure during an initial portion of the operating cycle for providing a signal representative of the viscosity of the material, means responsive to said viscosity signal deviating from a predetermined reference signal during an initial portion of the cycle for establishing a viscosity error signal, means responsive to the applied pressure deviating from a predetermined value for establishing an applied pressure error signal, and means responsive to one or both of said viscosity error signal and applied pressure error signal for controlling the pressure applied during the remainder of the cycle.

23. For an injection molding machine having a mold defining a cavity for receiving a plasticized material to form an article during a cycle of operation of the machine, apparatus for controlling the consistency and quality of the articles, said apparatus comprising, means for applying pressure to force the material into the mold cavity, means for sensing applied pressure and providing a signal representative of applied pressure, means for sensing cavity pressure and providing a signal representative of cavity pressure, means coupled from said means for sensing applied pressure for providing an applied pressure error signal when the applied pressure deviates from a predetermined reference pressure, means coupled from said means for sensing cavity pressure responsive to cavity pressure and coupled to said means for providing an applied pressure error signal for enabling the applied pressure error signal but only after the cavity pressure reaches a predetermined value, and feedback means responsive to said applied pressure error signal for controlling said means for applying pressure.

24. For an injection molding machine having a mold defining a cavity for receiving a plasticized material to form an article during a cycle of operation of the machine, a controller comprising;

means responsive to applied pressure and cavity pressure during an initial portion of the operating cycle for providing a signal representative of the viscosity of the material, means responsive to said viscosity signal deviating from a predetermined reference signal during the initial portion of the cycle for establishing a viscosity error signal, means for detecting the peak cavity pressure and providing a peak cavity pressure error when the peak pressure deviates from a reference pressure, logic means for modifying said viscosity error signal by the peak cavity pressure error signal to provide a modified error signal, and means responsive to said modified error signal for controlling the pressure applied during the remainder of the cycle.

* * * * *